United States Patent
Shankar et al.

(10) Patent No.: US 7,209,561 B1
(45) Date of Patent: Apr. 24, 2007

(54) SYSTEM AND METHOD FOR GENERATING ENCRYPTION SEED VALUES

(75) Inventors: Vishnu Shankar, Mountain View, CA (US); Jason Eaton, Mountain View, CA (US)

(73) Assignee: Cybersource Corporation, Mountain View, CA (US)

( * ) Notice: Subject to any disclaimer, the term of this patent is extended or adjusted under 35 U.S.C. 154(b) by 905 days.

(21) Appl. No.: 10/251,243

(22) Filed: Sep. 20, 2002

Related U.S. Application Data

(60) Provisional application No. 60/397,474, filed on Jul. 19, 2002.

(51) Int. Cl.
*H04L 9/00* (2006.01)
*G06F 1/00* (2006.01)

(52) U.S. Cl. .................. 380/262; 380/28; 380/46; 713/167; 713/193; 713/500

(58) Field of Classification Search .............. None
See application file for complete search history.

(56) References Cited

U.S. PATENT DOCUMENTS

| | | | |
|---|---|---|---|
| 5,201,000 A | | 4/1993 | Matyas et al. |
| 6,253,223 B1 * | | 6/2001 | Sprunk .................. 708/250 |
| 6,345,100 B1 * | | 2/2002 | Levine .................. 380/205 |
| 6,680,938 B1 * | | 1/2004 | Hammermeister et al. .. 370/360 |
| 6,823,455 B1 * | | 11/2004 | Macy et al. ............. 713/176 |
| 6,851,055 B1 * | | 2/2005 | Boyle et al. ............. 713/193 |

OTHER PUBLICATIONS

International Preliminary Examining Authority, "Written Opinion," May 14, 2004, 5 pages.
Current Claims from PCT application, International Application No. PCT/US03/22261, 6 pages.
Anders J. Johansson, et al., "Random Number Generation by Chaotic Double Scroll Oscillator on Chip," 1999, IEEE, XP-002260801, pp. V-407-V409.
Bruce Schneier, "Applied Cryptography, Second Edition, Protocols Algorithms, and Source code in C," 1996, pp. 44-46.
Mohan Atreya, "Pseudo Random Number Generators (PRNGs)," pp. 1-6, undated.
Intel, "Intel® Random Number Geneator (RNG)," http://www.intel.com/design/security/rng/rngfaq.htm, printed Jan. 29, 2003, pp. 1-3.
"Notification of Transmittal of International Preliminary Examination Report" received in corresponding International application No. PCT/US03/22261 (includes pending claims).

* cited by examiner

*Primary Examiner*—Gilberto Barrón, Jr.
*Assistant Examiner*—A. Nobahar
(74) *Attorney, Agent, or Firm*—Hickman Palmero Truong & Becker LLP; John D. Henkhaus

(57) ABSTRACT

A method for generating a seed value for use in symmetric encryption includes creating and storing a first data set and generating a hashed value based on the first data set. A replacement position in the first data set is selected, and at least a portion of the hashed value is written into the first data set at the replacement position. A seed portion of the first data set is selected as the seed value. By varying a number of iterations, a balance can be struck between performance (fewer iterations) and security (more iterations).

37 Claims, 5 Drawing Sheets

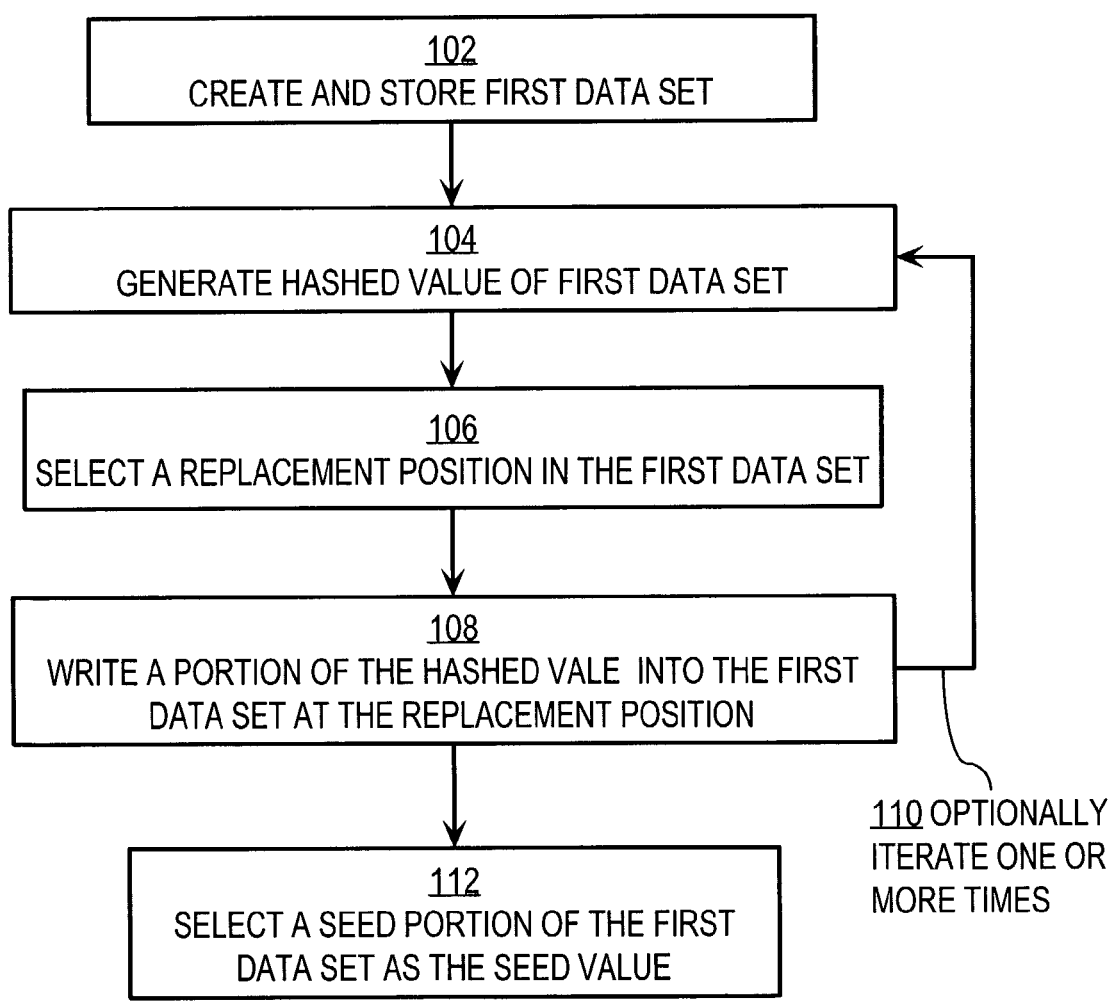

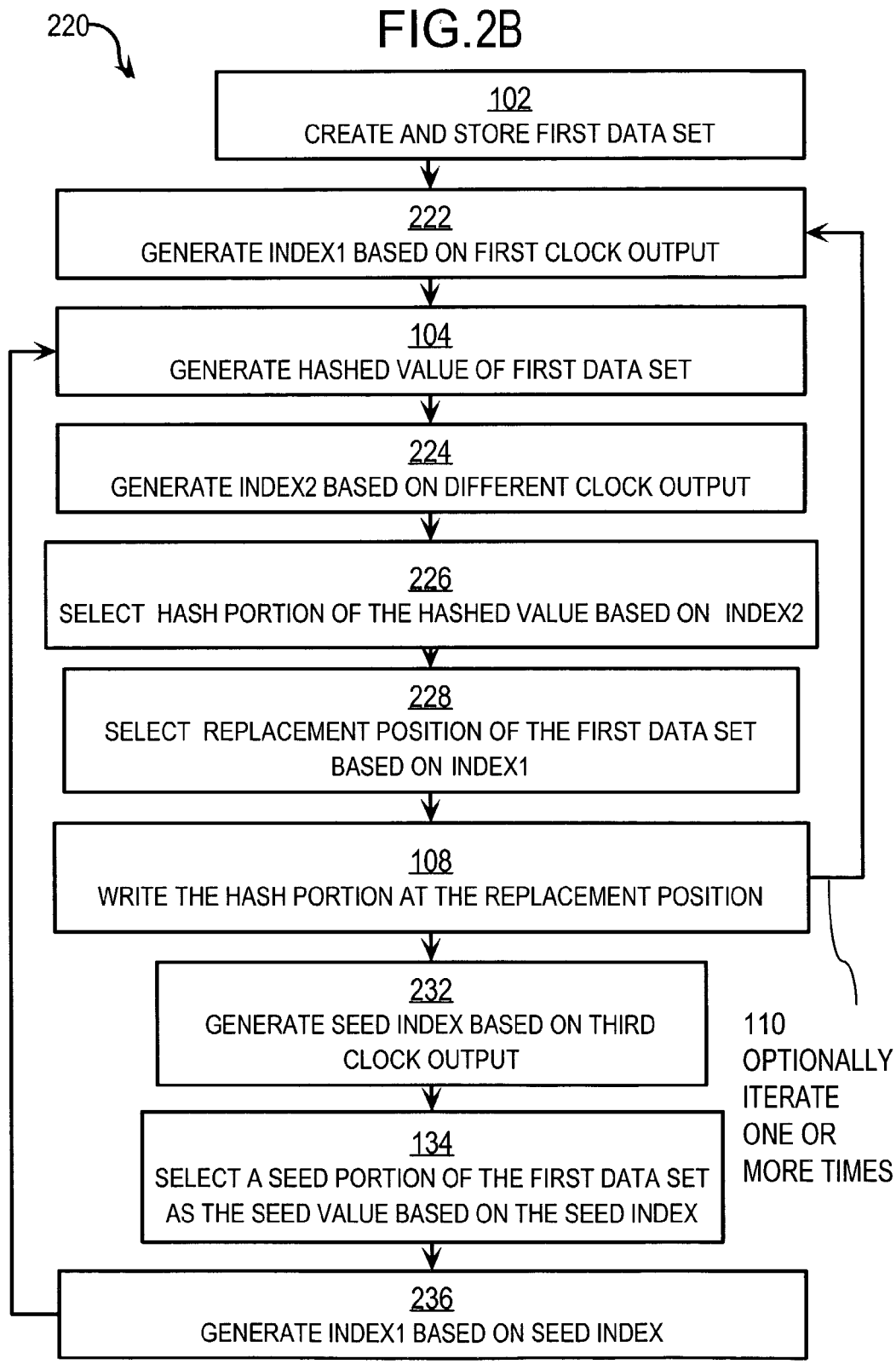

SYSTEM AND METHOD FOR GENERATING ENCRYPTION SEED VALUES

CROSS-REFERENCE TO RELATED APPLICATIONS; PRIORITY CLAIM

This application claims the benefit of prior Provisional application 60/397,474, filed Jul. 19, 2002, the entire contents of which is hereby incorporated by reference as if fully set forth herein, under 35 U.S.C. §119(e).

FIELD OF THE INVENTION

The present invention generally relates to computer-based cryptography. The invention relates more specifically to a system and method for generating encryption seed values.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer-based cryptography techniques are widely used for encrypting and decrypting data communications. Generally, encryption approaches are classified as symmetric or asymmetric. In symmetric cryptography, the same key is used to encrypt and decrypt the data. In asymmetric approaches, different keys are used for encryption and decryption.

Many symmetric cryptography approaches require a seed value as input for use in generating a unique key value for a particular data set. For example, certain block ciphers such as Data Encryption Standard (DES) use keys that are generated from random seed values. In some such approaches, theoretically perfect security is achieved when the seed value is a truly random value; this is because a truly random value is not predictable and therefore extremely difficult to guess. Further, the mechanism used to generate a truly random value is normally extremely difficult for a malicious party to reverse-engineer based only on possession of example seed values. In practice, however, generating truly random values is difficult, and therefore a variety of pseudo-random seed value generation approaches are also used.

An example of a known approach for generating a random seed value involves counting the number of process threads that are instantiated by a computer operating system in a specified time. Historically, this and other techniques for generating truly random or pseudo-random seed values have been either extremely time-consuming in terms of computer processing time, or non-random. Both are undesirable.

For example, in certain client-server business applications where all communications between the client and server are encrypted and decrypted, transaction processing may be perceptibly slower when a slow seed generation technique is used. Customers of these applications and the vendors who provide them would prefer an approach in which seed generation requires minimal time.

Further, having a non-random seed generator affects security. Several known approaches for generating seed values have bugs or other characteristics such that the seed values are not truly random. Indeed, nearly all seed generation approaches that profess to be truly random are, in fact, pseudo-random, as described in B. Schneier, "Applied Cryptography" (John Wiley & Sons, Inc., $2^{nd}$ ed. 1996), at pp. 44–46. If a pseudo-random seed value generator creates the same seed value twice, and a malicious party obtains two different ciphertexts that have been encrypted using a key based on the same seed value, in theory this provides the malicious party with valuable information that can be used to determine the key values and, ultimately, retrieve the original plaintext. This is undesirable.

Based on the foregoing, there is a clear need for an improved approach for generating seed values for use in symmetric encryption.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a flow diagram that illustrates a high level overview of one embodiment of a method for generating a seed value;

FIG. 2B is a flow diagram that illustrates a high level overview of another embodiment of a method for generating a seed value;

DETAILED DESCRIPTION OF THE PREFERRED EMBODIMENT

Figure 2A:
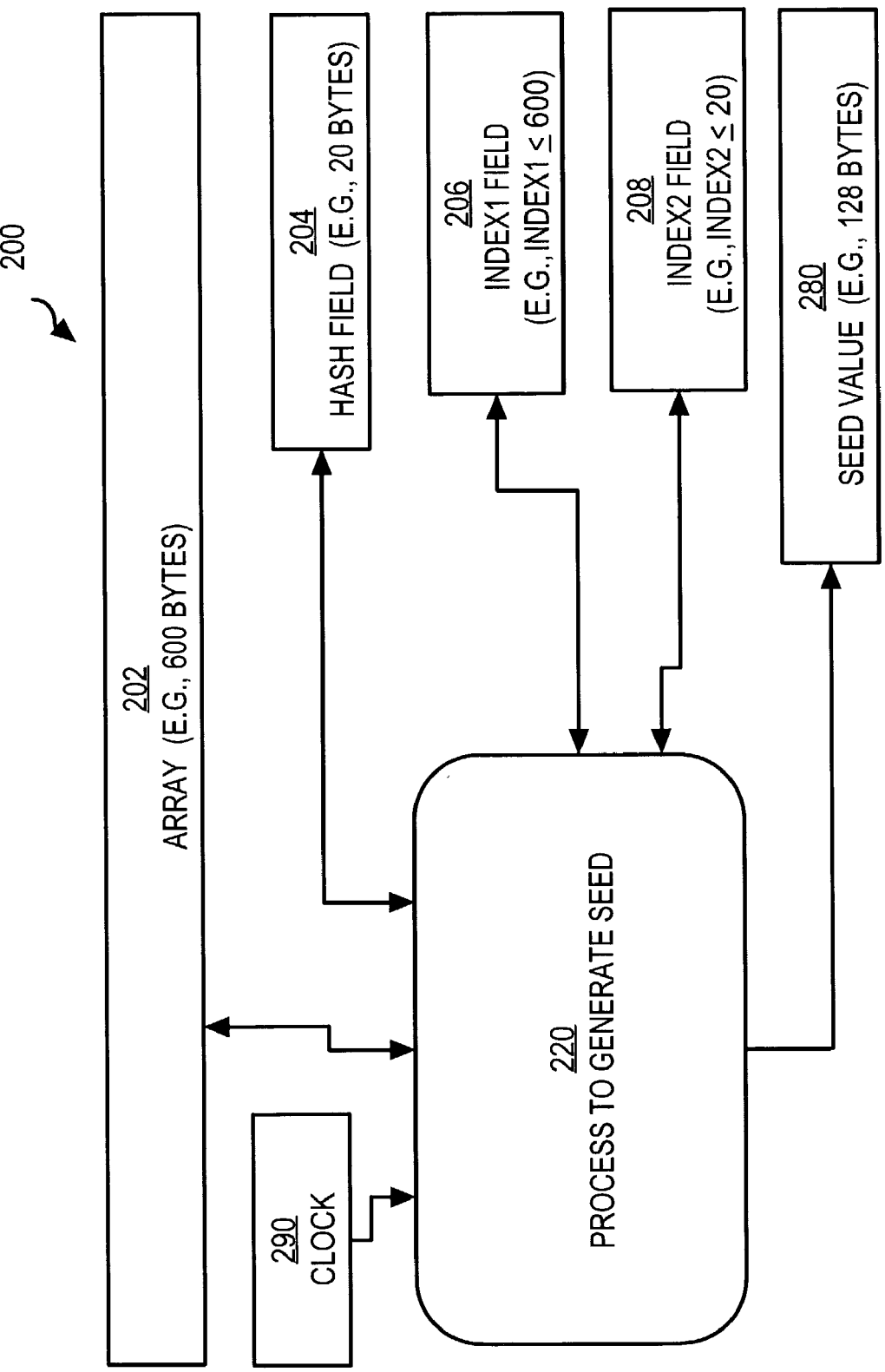
FIG. 2A is a block diagram that illustrates a system for generating a seed value according to an embodiment.

A method and apparatus for generating a seed value is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Structural Elements of Generating a Seed Value
4.0 Method of Generating a Seed Value
5.0 Implementation Mechanisms—Hardware Overview
6.0 Extensions and Alternatives 1.0 General Overview The needs identified in the foregoing Background, and other needs and objects that will become apparent for the following description, are achieved in the present invention, which comprises, in one aspect, a method for generating a seed value for use in symmetric encryption. The method includes creating and storing a first data set and generating a hashed value based on the first data set. A replacement position in the first data set is selected, and at least a portion of the hashed value is written into the first data set at the replacement position. A seed portion of the first data set is selected as the seed value.

In another aspect of the invention, a method of generating a seed value for use in symmetric encryption includes creating and storing a first data set. A first index value is generated; a hashed value based on the first data set is generated; and, a second index value is generated. A hash portion is selected from the hashed value. The hash portion has a size equal to the second index value. The hash portion is written into the first data set at a replacement position specified by the first index value. A seed index value is also generated. A portion of the first data set at a seed position specified by the seed index value is selected as the seed value.

In other aspects, the invention encompasses a computer apparatus, and a computer readable medium, including a carrier wave, configured to carry out the foregoing steps.

2.0 Structural and Functional Overview

In general, according to the approach herein, a new random seed value is generated based on an array of data that changes its value continually. A value in the array of data is hashed. Time-based index values, which are inherently variable, determine what portion of the hashed data is mixed with what portion of the array of data in an iterative process. As a result, the random seed value is generated. By varying the number of iterations, a balance can be struck between performance (fewer iterations) and security (more iterations).

In one embodiment, a relatively small pool of arbitrary data, such as approximately 600 bytes, is created and stored in an array in memory. A portion of the data pool, selected based on time, is mixed with hashed data at each of one or more iterations. After several iterations, all of the data pool is mixed. The mixed data provides a source for generating a random seed for use in generating a symmetric encryption key.

FIG. 1 is a flow diagram that illustrates a high level view of one embodiment of a method for generating encryption seed values.

In step 102, a first data set is created and stored in a data block or array in memory. The data set comprises a set of arbitrary or pseudo-randomly selected data values in a quantity sufficient to provide multiple locations for selecting a seed and small enough to permit rapid manipulation. For example, an array having a size in the range of 100 to 1000 bytes is appropriate to generate seeds of about 10 to 500 bytes. Let N represent the number of bytes in the first data set.

In step 104, a hash function is applied to produce a hashed value of the first data set. A hash function produces a hashed value that falls within a given range. The hashed value has a second number of bytes, represented by the symbol H. H may equal N or be different. In an illustrated embodiment, described below, H includes many fewer bytes than N. In step 106, a replacement position in the array is selected. The selected position is at a pseudo-randomly selected location. In step 108, a hash portion of the hashed value is written into the first data set starting at the replacement position. The hash portion is pseudo-randomly selected in either size or location within the H bytes, or both. As indicated by arrow 110, the steps 104–108 optionally are iterated one or more additional times. No additional iteration is required, however.

In step 112, a portion of the first data set is selected as the seed value. Thereafter, the selected seed value may be used to generate a key for use in a symmetric encryption approach, using any desired technique. Typically, the number of bytes in the seed value is dictated by the algorithm that generates the key based on the seed value. In embodiments illustrated below, the portion of the first data selected as the seed value, but not the size of the seed value, is pseudo-randomly selected based on time. In other embodiments, either or both position and size of the seed value may be selected pseudo-randomly.

A second seed may be generated by returning to step 104 and repeating steps 104, 106, 108 for another set of one or more iterations and then returning to step 112.

3.0 Structural Elements of Generating a Seed Value

FIG. 2A is a block diagram that illustrates a system 200 for generating a seed value according to an embodiment. The system includes a memory location for an array 202 of a particular size that holds the first data set. For purposes of illustration, it is assumed that the array 202 has a size of 600 bytes. The system includes a clock 290 that provides current time, as is standard on many computing devices.

The system also includes three fields that may be stored in memory or on disk. A hash field 204 holds the hashed value computed by applying a hash function to the data in the array 202. The hash field is large enough to hold the hashed value. In an illustrated embodiment, a hash function is applied to the data set in array 202 to generate a hashed value with 20 bytes. Therefore, in the illustrated embodiment, the hash field is 20 bytes in size. An index1 field holds a first index used to indicate a position in the array 202; therefore the index1 field is large enough to hold a value that is less than or equal to the size of array 202. In the illustrated embodiment, the index1 field is large enough to hold an integer up to 600. In some embodiments, 600 positions in array 202 are indicated by integers ranging from 0 to 599. An index2 field holds a second index used to indicate a position in the hash field 204; therefore the index2 field is large enough to hold a value that is less than or equal to the size of the hash field 204. In the illustrated embodiment, the index2 field is large enough to hold an integer up to 20. In some embodiments, 20 positions in array 202 are indicated by integers ranging from 0 to 19.

The system 200 includes one or more processes that generate the seed value based on the contents of the array 202, the fields 204, 206, 208 and the output from clock 290. For purposes of illustration, it is assumed that one process 220 is involved. The seed value 280 is expressed in any manner known at the time the system is generated. For example, in some embodiments, the seed value is a location in memory, shared by one or more processes; and, in other embodiments, the seed value is data in a message sent to another process. For purposes of illustration, it is assumed that the size of the seed value is 128 bytes. In other embodiments, larger, smaller, or pseudo-random sized seed values are generated. In preferred embodiments, the size of the seed value is smaller than the size of the array 202 by a factor of two or more. In the illustrated embodiment, the size of the seed value (128 bytes) is smaller than the array size (600 bytes) by a factor greater than four.

The process 220 reads the output from clock 290. The process 220 is authorized to write to array 202 and fields 204, 206, 208; thus, process 220 is able to change the values in the array 202 and in the fields 204, 206, 208.

4.0 Method of Generating a Seed Value

FIG. 2B is a flow diagram that illustrates a high-level overview process 220 for generating a seed value 280, according to an illustrated embodiment. Although steps in FIG. 2B are depicted in a particular order, in other embodiments, the steps can be performed in a different order or overlapping in time. For example, in some embodiments, steps 222 and 224 overlap step 104.

Initially, in step 102, as described above, an arbitrary set of data is created. For example, array 202 is created having arbitrary contents. The size of the array 202 is not critical, and a wide range of sizes may be used. In the illustrated embodiment, an array of 600 bytes is used. The random data in array 202 is then used within a mixing mechanism, process 220, for random seed generation. As used herein, the terms "created" and "stored" refer to temporary or transient storage of data values in volatile computer memory, such as RAM. Certain values may be stored in non-volatile memory or disk storage as a matter of design choice, but doing so is expected to reduce the security of the system by presenting opportunities for a malicious party to obtain the stored values. Thus, storage of all values in volatile memory is preferred.

Figure 2C:
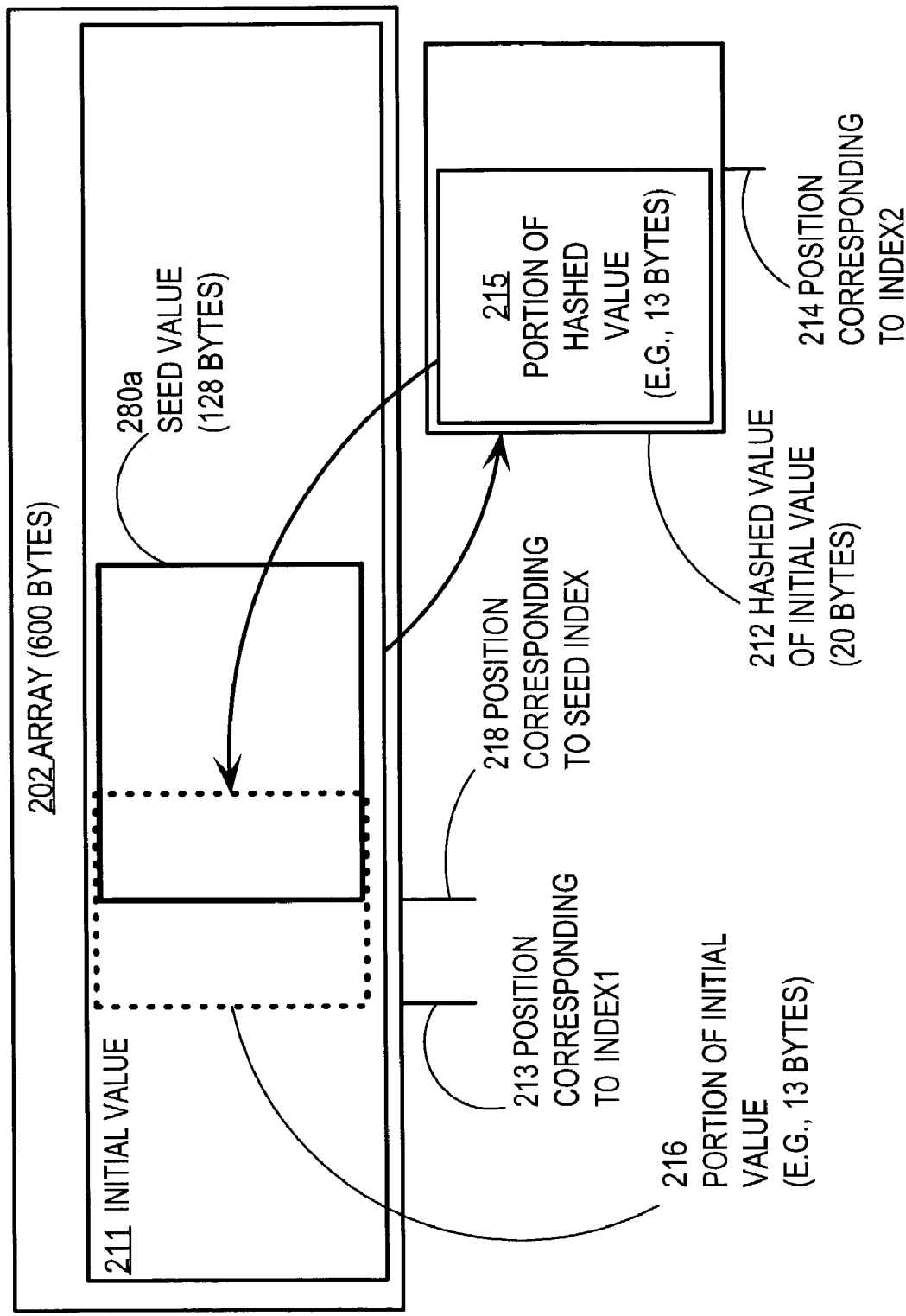
FIG. 2C is a block diagram that illustrates changes in a large array of data and a hashed value used to generate a seed value, according to an embodiment.

FIG. 2C is a block diagram that illustrates changes in data held in the large array 202 and a hashed value held in field 204 that are used to generate a seed value 280a, according to an embodiment. The array 202 holds an initial value 211 made up of 600 bytes as a result of step 102. The other elements in FIG. 2C are described below in the context of the steps taken during process 220 depicted in FIG. 2B.

In step 222, a value of index1 is generated based on a first output from clock 290. Any method to generate a value for index1 between 1 and N, the size of the array 202, may be used. In the illustrated embodiment, the number of milliseconds in the current time, by definition between 0 and 999, is input to a modulus operation with a modulus of 600. The output of the modulus operation with modulus 600, by definition, is a value between 0 and 599. One can be added to the output to change the value to the range between 1 and 600. Alternatively, the byte positions in the array 202 can be named, consecutively, "0" through "599" in either ascending or descending order. The value of index1 is stored in index1 field 206 depicted in FIG. 2A. In some embodiments, the current time is taken from clock 290 at the time that step 104, described below in more detail, is started.

In step 104, a one-way hash mechanism is applied to the data in array 202 to generate hashed data stored in hash field 204. The one-way hash mechanism is selected to provide security and to provide a fixed-length hash output. Any hash mechanism may be used. The hashed value output by the hash mechanism changes substantially even with the change of a single bit in the input. However, it is possible for several different inputs, otherwise unrelated to each other, to produce the same hashed value. Example hash mechanisms that can be used include Secure Hash Algorithm (SHA-1) and Message Digest 5 (MD-5), among others known in the art at the time the system is implemented. If SHA-1 is used, then hashed data stored in hash field 204 is a sequence of 20 bytes. For purposes of illustration, it is assumed that SHA-1 is used and that hash field 204 has a size of 20 bytes. FIG. 2C depicts the hashed value 212 stored in hash field 204 after step 104. An arrow pointing from initial value 211 to hashed value 212 in FIG. 2C indicates that the hashed value 212 is derived from the initial value 211 in array 202.

In step 224, a value of index2 is generated based on a second output from clock 290. Any method to generate a value for index1 between 1 and H, the size of the hash field 204, may be used. In the illustrated embodiment, the number of milliseconds in the current time, by definition between 0 and 999, is input to a modulus operation with a modulus of 10. The output of the modulus operation with modulus 10, by definition, is a value between 0 and 9. A value of "11" can be added to the output to change the value to the range between 11 and 20, so that index2 is no smaller than 11. Alternatively, the byte positions in the hash field 204 can be named, consecutively, "0" through "19" in either ascending or descending order, and a value of "10" can be added so that the value of index 2 is no smaller than 10. The value of index2 is stored in index2 field 208 depicted in FIG. 2A. In some embodiments, the second time for index2 is taken from clock 290 at the time that step 104, described above, returns a hashed value. For purposes of illustration, it is assumed that index2 varies between 11 and 20, and has a current value of 13.

In step 226, the number of bytes indicated by the second index value, index2 in index2 field 208, is selected from the hashed value in hash field 204. In the illustrated embodiment, as depicted in FIG. 2C, a 13-byte hash portion 215 of hashed value 212 is selected. In other embodiments, other methods to select the hash portion may be used. For example, the value in index2 can be used to indicate the start of the hash portion.

In step 228 an ordinal byte position in the array 202 is defined by the first index value, index1 in index1 field 206. This position is called herein the "replacement position" because it is used to indicate where the data in array 202 is to be replaced by the hash portion. In the illustrated embodiment depicted in FIG. 2C, a replacement position 213 corresponds to index1.

In step 108, the hash portion is written into the array 202 starting at the replacement position. In the illustrated embodiment depicted in FIG. 2C, the hash portion 215 is written to the array 202 starting at replacement position 213. The portion of the initial value 211 replaced is indicated by portion 216 circumscribed by a dashed line. The arrow pointing from hash portion 215 to replaced portion 216 indicates the writing done during step 108. If this operation would require writing beyond the end of the array 202, then the ordinal byte position of the next byte written is reset to the first byte of the array 202 and writing continues at that point.

The preceding process is repeated one or more times, as indicated by an arrow returning control to step 222 from step 108 in FIG. 2B. No specific number of iterations is required. However, the number of iterations theoretically increases the randomness of the seed value that is ultimately generated, and therefore increases the security of a symmetric encryption system that uses the seed value. Thus, the number of iterations can be changed depending on the desired level of security. Performance decrease with increasing iterations. Thus a user can select an appropriate balance between performance and randomness by adjusting the number of iterations.

After a specified number of iterations of the preceding process, the array 202 contains mixed data in place of some or all the bytes of the initial value 211. In step 232, a value of a seed index is generated based on a third output from clock 290. Any method to generate a value for the seed index between 1 and N, the size of the array 202, may be used. In the illustrated embodiment, the number of milliseconds in the third current time is input to a modulus operation with a modulus of 600, as described above for index1.

In step 134, seed bytes for seed value 280 are selected from the mixed data in array 202 at an ordinal position indicated by the seed index value. The number of seed bytes selected is application-specific and may vary depending on the type of symmetric encryption algorithm that is used. If the number of seed bytes exceeds the number of bytes from the index to the end of the array 202, then the ordinal is reset to one and bytes are read from the beginning of the array 202. In the illustrated embodiment depicted in FIG. 2C, 128 bytes are selected starting at position 218 that corresponds to the seed index.

In step 236, the seed index value is stored as the first index value, in index1 field 206, for use in subsequent generation of additional seed values as indicated by an arrow passing control to step 104 from step 236.

Using the foregoing process, a seed value useful in generating a symmetric encryption key value is produced efficiently and rapidly. The index values used in the process can be calculated from clock or time values that are taken at irregular intervals. The data in array 202 changes for each seed value, and rapidly becomes very random as processing progresses. In an implementation, processing performance is found to be good, and the theoretical security of the process is found to be high.

The number of iterations can be changed depending on the level of security that is desired. The amount of processing time required by the system to generate a seed value may be tuned by changing the number of iterations. Thus, the number of iterations may be changed to balance the security and processing time of the method. The data in array 202 is difficult for a malicious party to obtain because it is stored in memory at all times during performance of the process.

5. Implementation Mechanisms—Hardware Overview

Figure 3:
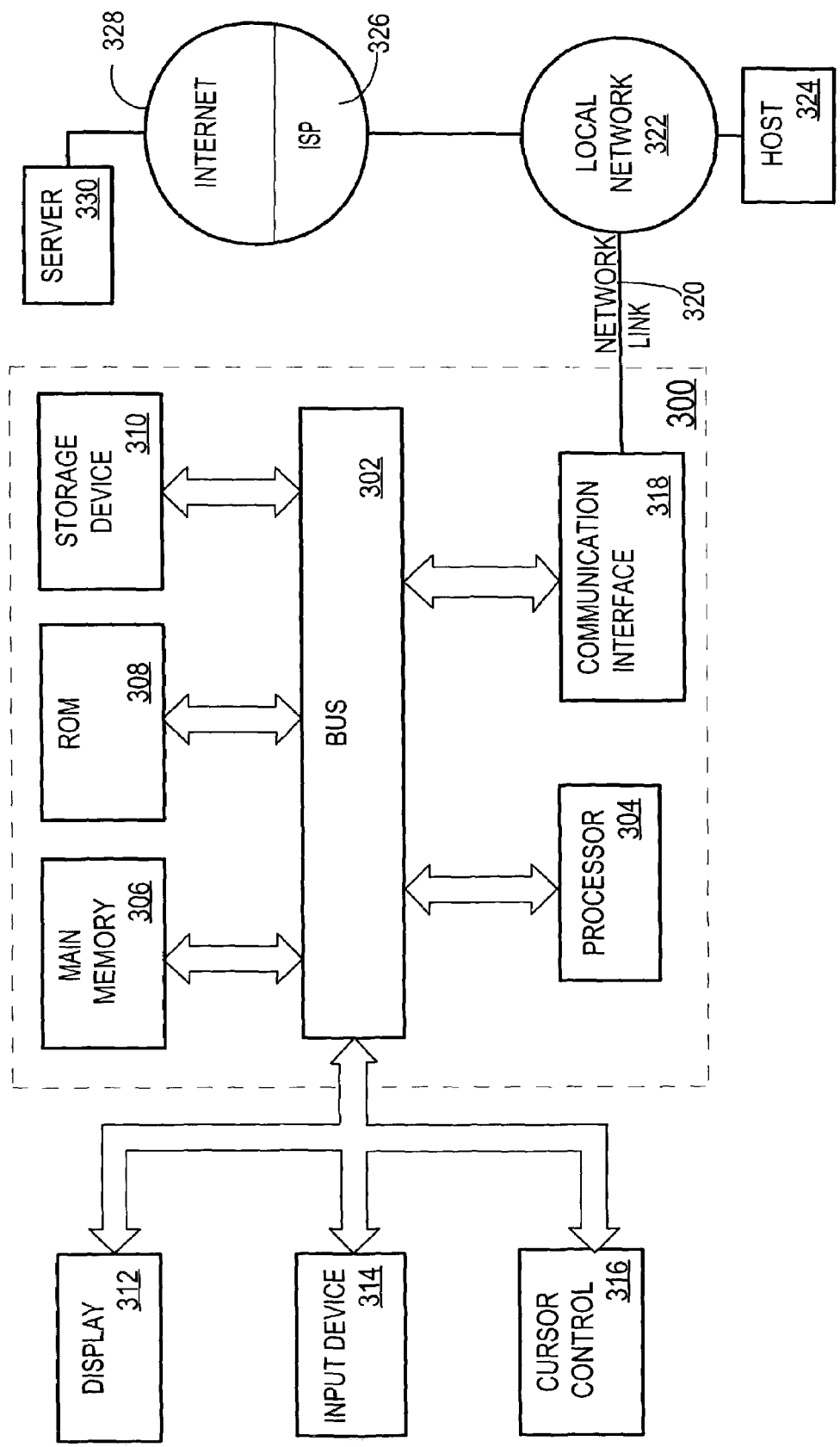
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for generating a seed value for use in symmetric encryption. According to one embodiment of the invention, generating a seed value for use in symmetric encryption is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for generating a seed value for use in symmetric encryption as described herein.

The received code may be executed by processor 304 as it is received, and/or stored in storage device 310, or other non-volatile storage for later execution. In this manner, computer system 300 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of generating a seed value for use in symmetric encryption, the method comprising the computer-implemented steps of:
   (a) creating and storing a first data set;
   (b) generating a hashed value based on the first data set;
   (c) selecting, based on a time-based value associated with the step of generating the hashed value, a replacement position in the first data set;
   (d) writing at least a portion of the hashed value into the first data set at the replacement position;
   (e) selecting, as the seed value, a seed portion of the first data set;
   (f) generating a symmetric encryption key based on the seed value; and
   (g) encrypting, using the symmetric encryption key, data communicated to a computer system.

2. A method as recited in claim 1, said step of selecting the replacement position comprising deriving the replacement position from a first then-current system clock value.

3. A method as recited in claim 1, further comprising selecting the portion of the hashed value to have a size based on a then-current system clock value.

4. A method as recited in claim 2, further comprising selecting the portion of the hashed value to have a size based on a second then-current system clock value at a different time.

5. A method as recited in claim 1, said step of selecting the seed portion comprising deriving a starting position for the seed portion from a then-current system clock value.

6. A method as recited in claim 1, further comprising, after step (d) and before step (e), performing the step of repeating steps (b) through (d), inclusive, for a specified number of iterations.

7. A method as recited in claim 1, said step of selecting the replacement position further comprising selecting the replacement position based on a previously selected seed portion.

8. A method of generating a seed value for use in symmetric encryption, the method comprising the computer-implemented steps of:
   (a) creating and storing a first data set;
   (b) generating a first index value;
   (c) generating a hashed value based on the first data set;
   (d) generating a second index value;
   (e) selecting a hash portion from the hashed value, wherein the hash portion has a size equal to the second index value;
   (f) writing the hash portion into the first data set at a replacement position specified by the first index value;
   (g) generating a seed index value;
   (h) selecting, as the seed value, a portion of the first data set at a seed position specified by the seed index value;
   (i) generating a symmetric encryption key based on the seed value; and
   (j) encrypting, using the symmetric encryption key, data communicated to a computer system.

9. A method as recited in claim 8, wherein at least one of said steps of generating the first index value, generating the second index value and generating the seed index value further comprises determining a system clock value.

10. A method as recited in claim 8, wherein at least one of said steps of generating the first index value, generating the second index value and generating the seed index value further comprises computing a modulus operation having as input a portion of a system clock value.

11. A method as recited in claim 9, wherein a first system clock value determined during one of said steps of generating the first index value, generating the second index value and generating the seed index value of is different from a second system clock value determined during a different one of said steps of generating the first index value, generating the second index value and generating the seed index value.

12. A method as recited in claim 9, wherein each system clock value determined during one of said steps of generating the first index value, generating the second index value and generating the seed index value of is different from a second system clock value determined during a different one of said steps of generating the first index value, generating the second index value and generating the seed index value.

13. A method as recited in claim 7, further comprising, after step (f) and before step (g), performing the step of repeating steps (b) through (f), inclusive, for a specified number of iterations.

14. A computer-readable medium carrying one or more sequences of instructions for generating a seed value for use in symmetric encryption, which instructions, when executed by one or more processors, cause the one or more processors to carry out the steps of:
   (a) creating and storing a first data set;
   (b) generating a hashed value based on the first data set;
   (c) selecting, based on a time-based value associated with the step of generating the hashed value, a replacement position in the first data set;
   (d) writing at least a portion of the hashed value into the first data set at the replacement position;
   (e) selecting, as the seed value, a seed portion of the first data set;
   (f) generating a symmetric encryption key based on the seed value; and
   (g) encrypting, using the symmetric encryption key, data communicated to a computer system.

15. A computer-readable medium as recited in claim 14, said step of selecting the replacement position comprising deriving the replacement position from a first then-current system clock value.

16. A computer-readable medium as recited in claim 14, further comprising selecting the portion of the hashed value to have a size based on a then-current system clock value.

17. A computer-readable medium as recited in claim 16, further comprising selecting the portion of the hashed value to have a size based on a second then-current system clock value at a different time.

18. A computer-readable medium as recited in claim 14, said step of selecting the seed portion comprising deriving a starting position for the seed portion from a then-current system clock value.

19. A computer-readable medium as recited in claim 14, further comprising, after step (d) and before step (e), performing the step of repeating steps (b) through (d), inclusive, for a specified number of iterations.

20. A computer-readable medium as recited in claim 14, said step of selecting the replacement position further comprising selecting the replacement position based on a previously-selected seed portion.

21. An apparatus for generating a seed value for use in symmetric encryption, the apparatus comprising:
means for creating and storing a first data set;
means for generating a hashed value based on the first data set;
means for selecting, based on a time-based value associated with the step of generating the hashed value, a replacement position in the first data set;
means for writing at least a portion of the hashed value into the first data set at the replacement position;
means for selecting, as the seed value, a seed portion of the first data set;
means for generating a symmetric encryption key based on the seed value; and
means for encrypting, using the symmetric encryption key, data communicated to a computer system.

22. An apparatus as recited in claim 21, said means for selecting the replacement position comprising means for deriving the replacement position from a first then-current system clock value.

23. An apparatus as recited in claim 21, further comprising means for selecting the portion of the hashed value to have a size based on a then-current system clock value.

24. An apparatus as recited in claim 23, further comprising selecting the portion of the hashed value to have a size based on a second then-current system clock value at a different time.

25. An apparatus as recited in claim 21, said step of selecting the seed portion comprising deriving a starting position for the seed portion from a then-current system clock value.

26. An apparatus as recited in claim 21, further comprising means for repeating operation of the means for generating, selecting and writing, inclusive, for a specified number of iterations.

27. An apparatus as recited in claim 21, said means for selecting the replacement position further comprising means for selecting the replacement position based on a previously selected seed portion.

28. An apparatus for generating a seed value for use in symmetric encryption, the apparatus comprising:
a network interface that is coupled to a data network for receiving one or more packet flows therefrom;
a processor;
one or more stored sequences of instructions which, when executed by the processor, cause the processor to carry out the steps of:
creating and storing a first data set;
generating a hashed value based on the first data set;
selecting, based on a time-based value associated with the step of generating the hashed value, a replacement position in the first data set;
writing at least a portion of the hashed value into the first data set at the replacement position;
selecting, as the seed value, a seed portion of the first data set;
generating a symmetric encryption key based on the seed value; and
encrypting, using the symmetric encryption key, data communicated to a computer system.

29. An apparatus as recited in claim 28, said step of selecting the replacement position comprising deriving the replacement position from a first then-current system clock value.

30. An apparatus as recited in claim 28, further comprising selecting the portion of the hashed value to have a size based on a then-current system clock value.

31. An apparatus as recited in claim 30, further comprising selecting the portion of the hashed value to have a size based on a second then-current system clock value at a different time.

32. An apparatus as recited in claim 28, said step of selecting the seed portion comprising deriving a starting position for the seed portion from a then-current system clock value.

33. An apparatus as recited in claim 28, further comprising, after the step of writing and before the step of selecting, repeating the steps of generating a hashed value through writing, inclusive, for a specified number of iterations.

34. An apparatus as recited in claim 28, said step of selecting the replacement position further comprising selecting the replacement position based on a previously selected seed portion.

35. A computer-readable medium carrying one or more sequences of instructions for generating a seed value for use in encryption, which instructions, when executed by one or more processors, cause the one or more processors to carry out the steps of:
(a) creating and storing a first data set;
(b) generating a first index value;
(c) generating a hashed value based on the first data set;
(d) generating a second index value;
(e) selecting a hash portion from the hashed value, wherein the hash portion has a size equal to the second index value;
(f) writing the hash portion into the first data set at a replacement position specified by the first index value;
(g) generating a seed index value;
(h) selecting, as the seed value, a portion of the first data set at a seed position specified by the seed index value;
(i) generating a symmetric encryption key based on the seed value; and
(j) encrypting, using the symmetric encryption key, data communicated to a computer system.

36. A system for generating a seed value for use in encryption, the system comprising:
(a) means for creating and storing a first data set;
(b) means for generating a first index value;
(c) means for generating a hashed value based on the first data set;
(d) means for generating a second index value;
(e) means for selecting a hash portion from the hashed value, wherein the hash portion has a size equal to the second index value;

(f) means for writing the hash portion into the first data set at a replacement position specified by the first index value;
(g) means for generating a seed index value;
(h) means for selecting, as the seed value, a portion of the first data set at a seed position specified by the seed index value;
(i) means for generating a symmetric encryption key based on the seed value; and
(j) means for encrypting, using the symmetric encryption key, data communicated to a computer system.

37. An apparatus for generating a seed value for use in symmetric encryption, the apparatus comprising:
   a network interface that is coupled to a data network for receiving one or more packet flows therefrom;
   a processor;
one or more stored sequences of instructions which, when executed by the processor, cause the processor to carry out the steps of:

(a) creating and storing a first data set;
(b) generating a first index value;
(c) generating a hashed value based on the first data set;
(d) generating a second index value;
(e) selecting a hash portion from the hashed value, wherein the hash portion has a size equal to the second index value;
(f) writing the hash portion into the first data set at a replacement position specified by the first index value;
(g) generating a seed index value;
(h) selecting, as the seed value, a portion of the first data set at a seed position specified by the seed index value;
(i) generating a symmetric encryption key based on the seed value; and
(j) encrypting, using the symmetric encryption key, data communicated to a computer system.

* * * * *